US010386962B1

(12) United States Patent
Jin et al.

(10) Patent No.: US 10,386,962 B1
(45) Date of Patent: Aug. 20, 2019

(54) REDUCING TOUCH NODE ELECTRODE COUPLING

(71) Applicant: Apple Inc., Cupertino, CA (US)

(72) Inventors: Jiayi Jin, San Jose, CA (US); Ruo-Gu Huang, San Jose, CA (US); Wei Hsin Yao, Palo Alto, CA (US); Weijun Yao, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/226,628

(22) Filed: Aug. 2, 2016

Related U.S. Application Data

(60) Provisional application No. 62/200,571, filed on Aug. 3, 2015.

(51) Int. Cl.
G06F 3/041 (2006.01)
G06F 3/044 (2006.01)

(52) U.S. Cl.
CPC ............ G06F 3/0418 (2013.01); G06F 3/044 (2013.01); G06F 3/0412 (2013.01)

(58) Field of Classification Search
CPC ....... G06F 3/0418; G06F 3/0412; G06F 3/044
See application file for complete search history.

(56) References Cited

U.S. PATENT DOCUMENTS

| 5,483,261 A | 1/1996 | Yasutake |
| 5,488,204 A | 1/1996 | Mead et al. |
| 5,825,352 A | 10/1998 | Bisset et al. |
| 5,835,079 A | 11/1998 | Shieh |
| 5,847,690 A | 12/1998 | Boie et al. |
| 5,880,411 A | 3/1999 | Gillespie et al. |
| 5,889,236 A | 3/1999 | Gillespie et al. |
| 5,914,465 A | 6/1999 | Allen et al. |
| 6,127,899 A | 10/2000 | Silva et al. |
| 6,188,391 B1 | 2/2001 | Seely et al. |
| 6,204,897 B1 | 3/2001 | Colgan et al. |
| 6,310,610 B1 | 10/2001 | Beaton et al. |
| 6,323,846 B1 | 11/2001 | Westerman et al. |
| 6,373,474 B1 | 4/2002 | Katabami |

(Continued)

FOREIGN PATENT DOCUMENTS

| CN | 1202254 A | 12/1998 |
| CN | 2012-18943 Y | 4/2009 |

(Continued)

OTHER PUBLICATIONS

Notice of Allowance dated Sep. 28, 2016, for U.S. Appl. No. 13/907,698, filed May 31, 2013, seven pages.

(Continued)

Primary Examiner — Dmitriy Bolotin
(74) Attorney, Agent, or Firm — Kubota & Basol LLP

(57) ABSTRACT

A touch screen is disclosed. The touch screen comprises a first touch node electrode associated with a first display pixel, the first display pixel coupled to a first gate line. The touch screen also comprises a second touch node electrode associated with a second display pixel, the second display pixel coupled to a second gate line. The touch screen also comprises a voltage source coupled to a first gate line routing and a second gate line routing, wherein the first gate line is coupled to the first gate line routing, and the second gate line is coupled to the second gate line routing.

26 Claims, 10 Drawing Sheets

(56) References Cited

U.S. PATENT DOCUMENTS

| | | |
|---|---|---|
| 6,429,700 B1 | 8/2002 | Yang |
| 6,587,358 B1 | 7/2003 | Yasumura |
| 6,690,387 B2 | 2/2004 | Zimmerman et al. |
| 6,847,354 B2 | 1/2005 | Vranish |
| 7,015,894 B2 | 3/2006 | Morohoshi |
| 7,151,417 B1 | 12/2006 | Suzuki |
| 7,184,064 B2 | 2/2007 | Zimmerman et al. |
| 7,288,945 B2 | 10/2007 | Martinez et al. |
| 7,525,348 B1 | 4/2009 | Ziazadeh |
| 7,589,596 B2 | 9/2009 | Masuda et al. |
| 7,663,607 B2 | 2/2010 | Hotelling et al. |
| 7,898,122 B2 | 3/2011 | Andrieux et al. |
| 7,961,055 B2 | 6/2011 | Miyata et al. |
| 7,986,194 B2 | 7/2011 | Kiyohara et al. |
| 8,149,002 B2 | 4/2012 | Ossart et al. |
| 8,222,885 B2 | 7/2012 | Kirchmeier et al. |
| 8,355,887 B1 | 1/2013 | Harding et al. |
| 8,436,687 B2 | 5/2013 | Aruga et al. |
| 8,479,122 B2 | 7/2013 | Hotelling et al. |
| 8,665,237 B2 | 3/2014 | Koshiyama et al. |
| 8,766,950 B1 | 7/2014 | Morein et al. |
| 8,773,351 B2 | 7/2014 | Rekimoto |
| 8,917,256 B2 | 12/2014 | Roziere |
| 8,933,710 B2 | 1/2015 | Blondin et al. |
| 8,963,372 B2 | 2/2015 | Takano et al. |
| 9,000,782 B2 | 4/2015 | Roziere |
| 9,151,791 B2 | 10/2015 | Roziere |
| 9,250,757 B2 | 2/2016 | Roziere |
| 9,268,427 B2* | 2/2016 | Yousefpor ............. G06F 3/0412 |
| 9,401,697 B2 | 7/2016 | Blondin et al. |
| 9,442,330 B2 | 9/2016 | Huo |
| 9,448,675 B2* | 9/2016 | Morein ................... G06F 3/044 |
| 9,535,544 B2 | 1/2017 | Yousefpor et al. |
| 9,535,547 B2 | 1/2017 | Roziere |
| 9,640,991 B2 | 5/2017 | Blondin et al. |
| 10,007,388 B2 | 6/2018 | Roziere |
| 10,133,382 B2 | 11/2018 | Yang et al. |
| 10,175,832 B2 | 1/2019 | Roziere |
| 2002/0015024 A1 | 2/2002 | Westerman et al. |
| 2003/0075427 A1 | 4/2003 | Caldwell |
| 2004/0243747 A1 | 12/2004 | Rekimoto |
| 2005/0219228 A1 | 10/2005 | Alameh et al. |
| 2006/0161871 A1 | 7/2006 | Hotelling et al. |
| 2006/0197753 A1 | 9/2006 | Hotelling |
| 2008/0012835 A1 | 1/2008 | Rimon et al. |
| 2008/0042985 A1 | 2/2008 | Katsuhito et al. |
| 2008/0062148 A1 | 3/2008 | Hotelling et al. |
| 2008/0100572 A1 | 5/2008 | Boillot |
| 2008/0158182 A1 | 7/2008 | Westerman |
| 2008/0174321 A1 | 7/2008 | Kang et al. |
| 2008/0246496 A1 | 10/2008 | Hristov et al. |
| 2009/0009485 A1 | 1/2009 | Bytheway |
| 2009/0091546 A1 | 4/2009 | Joo et al. |
| 2009/0109192 A1 | 4/2009 | Liu |
| 2009/0141046 A1 | 6/2009 | Rathnam et al. |
| 2009/0179868 A1 | 7/2009 | Ayres et al. |
| 2009/0212642 A1 | 8/2009 | Krah |
| 2009/0309851 A1 | 12/2009 | Bernstein |
| 2010/0001973 A1 | 1/2010 | Hotelling et al. |
| 2010/0004029 A1 | 1/2010 | Kim |
| 2010/0019779 A1 | 1/2010 | Kato et al. |
| 2010/0031174 A1 | 2/2010 | Kim |
| 2010/0090964 A1 | 4/2010 | Soo et al. |
| 2010/0097346 A1 | 4/2010 | Sleeman |
| 2010/0123667 A1 | 5/2010 | Kim et al. |
| 2010/0139991 A1 | 6/2010 | Philipp et al. |
| 2010/0149127 A1 | 6/2010 | Fisher et al. |
| 2010/0182018 A1 | 7/2010 | Hazelden |
| 2010/0194695 A1 | 8/2010 | Hotelling et al. |
| 2010/0194698 A1 | 8/2010 | Hotelling et al. |
| 2010/0201635 A1 | 8/2010 | Klinghult et al. |
| 2010/0253638 A1* | 10/2010 | Yousefpor ............. G06F 3/0412 345/173 |
| 2010/0277418 A1 | 11/2010 | Huang |
| 2010/0328262 A1 | 12/2010 | Huang et al. |
| 2011/0001491 A1 | 1/2011 | Huang et al. |
| 2011/0007021 A1 | 1/2011 | Bernstein et al. |
| 2011/0007030 A1 | 1/2011 | Mo et al. |
| 2011/0061949 A1 | 3/2011 | Krah et al. |
| 2011/0080391 A1 | 4/2011 | Brown et al. |
| 2011/0298727 A1 | 12/2011 | Yousefpor et al. |
| 2012/0182251 A1 | 7/2012 | Krah |
| 2012/0187965 A1 | 7/2012 | Roziere |
| 2012/0262410 A1 | 10/2012 | Lim |
| 2012/0287068 A1 | 11/2012 | Colgate |
| 2014/0070823 A1 | 3/2014 | Roziere |
| 2014/0132534 A1 | 5/2014 | Kim |
| 2014/0267165 A1 | 9/2014 | Roziere |
| 2014/0327654 A1 | 11/2014 | Sugita et al. |
| 2014/0354586 A1 | 12/2014 | Yousefpor |
| 2015/0084911 A1* | 3/2015 | Stronks ................ G06F 3/0416 345/174 |
| 2015/0116243 A1 | 4/2015 | Saitou et al. |
| 2016/0034102 A1 | 2/2016 | Roziere et al. |
| 2016/0170533 A1 | 6/2016 | Roziere |
| 2016/0188040 A1* | 6/2016 | Shin ....................... G06F 3/047 345/174 |
| 2017/0108968 A1 | 4/2017 | Roziere |
| 2017/0220156 A1 | 8/2017 | Blondin |
| 2017/0315646 A1 | 11/2017 | Roziere |

FOREIGN PATENT DOCUMENTS

| | | |
|---|---|---|
| DE | 11-2012 004912 | 8/2014 |
| EP | 2 144 146 A1 | 1/2010 |
| EP | 2 148 264 A2 | 1/2010 |
| EP | 2 224 277 A1 | 9/2010 |
| FR | 2 756 048 A1 | 5/1998 |
| FR | 2 896 595 A1 | 7/2007 |
| FR | 3 004 551 A1 | 10/2014 |
| JP | 2000-163031 A | 6/2000 |
| JP | 2002-342033 A | 11/2002 |
| JP | 2004-526265 A | 8/2004 |
| JP | 2006-251927 A | 9/2006 |
| JP | 2008-117371 A | 5/2008 |
| JP | 2009-086240 A | 4/2009 |
| JP | 2009-157373 A | 7/2009 |
| KR | 10-2008-0041278 A | 5/2008 |
| KR | 10-2011-0044670 A | 4/2011 |
| WO | WO-2006/126703 A2 | 11/2006 |
| WO | WO-2007/146780 A2 | 12/2007 |
| WO | WO-2008/000964 A1 | 1/2008 |
| WO | WO-2008/030780 A1 | 3/2008 |
| WO | WO-2011/015795 A2 | 2/2011 |
| WO | WO-2011/015795 A3 | 2/2011 |
| WO | WO-2013/093327 A1 | 6/2013 |
| WO | WO-2016/066282 A1 | 5/2016 |

OTHER PUBLICATIONS

Notice of Allowance dated Aug. 16, 2016, for U.S. Appl. No. 13/907,698, filed May 31, 2013, ten pages.

Final Office Action dated Feb. 2, 2016, for U.S. Appl. No. 13/907,698, filed May 31, 2013, twelve pages.

Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.

Non-Final Office Action dated Jul. 2, 2015, for U.S. Appl. No. 13/907,698, filed May 31, 2013, nine pages.

Rubine, D.H. (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages.

Rubine, D.H. (May 1992). "Combining Gestures and Direct Manipulation," CHI '92, pp. 659-660.

Westerman, W. (Spring 1999). "Hand Tracking, Finger Identification, and Chordic Manipulation on a Multi-Touch Surface," A Dissertation Submitted to the Faculty of the University of Delaware

(56) References Cited

OTHER PUBLICATIONS in Partial Fulfillment of the Requirements for the Degree of Doctor of Philosophy in Electrical Engineering, 364 pages.

* cited by examiner

REDUCING TOUCH NODE ELECTRODE COUPLING

CROSS REFERENCE TO RELATED APPLICATIONS

This Application claims the benefit of U.S. Provisional Application No. 62/200,571 filed on Aug. 3, 2015, the entire disclosure of which is herein incorporated by reference for all purposes.

FIELD OF THE DISCLOSURE

This relates generally to touch screens, and more particularly, to reducing touch node electrode coupling in a touch screen.

BACKGROUND OF THE DISCLOSURE

Many types of input devices are presently available for performing operations in a computing system, such as buttons or keys, mice, trackballs, joysticks, touch sensor panels, touch screens and the like. Touch screens, in particular, are becoming increasingly popular because of their ease and versatility of operation as well as their declining price. Touch screens can include a touch sensor panel, which can be a clear panel with a touch-sensitive surface, and a display device such as a liquid crystal display (LCD) that can be positioned partially or fully behind the panel so that the touch-sensitive surface can cover at least a portion of the viewable area of the display device. Touch screens can allow a user to perform various functions by touching the touch sensor panel using a finger, stylus or other object at a location often dictated by a user interface (UI) being displayed by the display device. In general, touch screens can recognize a touch and the position of the touch on the touch sensor panel, and the computing system can then interpret the touch in accordance with the display appearing at the time of the touch, and thereafter can perform one or more actions based on the touch. In the case of some touch sensing systems, a physical touch on the display is not needed to detect a touch. For example, in some capacitive-type touch sensing systems, fringing electrical fields used to detect touch can extend beyond the surface of the display, and objects approaching near the surface may be detected near the surface without actually touching the surface.

Capacitive touch sensor panels can be formed by a matrix of substantially transparent conductive plates made of materials such as Indium Tin Oxide (ITO). It is due in part to their substantial transparency that capacitive touch sensor panels can be overlaid on a display to form a touch screen, as described above. Some touch screens can be formed by partially integrating touch sensing circuitry into a display pixel stackup (i.e., the stacked material layers forming the display pixels). This integration of the touch hardware and display hardware can lead to parasitic capacitive pathways that can interfere with normal touch detection.

SUMMARY OF THE DISCLOSURE

Some capacitive touch sensor panels can be formed by a matrix of substantially transparent conductive plates made of materials such as Indium Tin Oxide (ITO), and some touch screens can be formed by partially integrating touch sensing circuitry into a display pixel stackup (i.e., the stacked material layers forming the display pixels). In some examples, common electrodes on the touch screen can serve as touch sensing circuitry during a touch sensing phase, and can serve as display circuitry during a display phase. During the touch sensing phase of the touch screen, noise signal coupling from one touch node electrode to another can interfere with normal touch detection. Such noise signal coupling can be caused by parasitic capacitive pathways that can exist over a shared gate line electrically connected to display pixels in the respective touch node electrodes. The following description includes examples of reducing or eliminating the above noise signal coupling.

DETAILED DESCRIPTION

In the following description of examples, reference is made to the accompanying drawings which form a part hereof, and in which it is shown by way of illustration specific examples that can be practiced. It is to be understood that other examples can be used and structural changes can be made without departing from the scope of the disclosed examples.

Some capacitive touch sensor panels can be formed by a matrix of substantially transparent conductive plates made of materials such as Indium Tin Oxide (ITO), and some touch screens can be formed by partially integrating touch sensing circuitry into a display pixel stackup (i.e., the stacked material layers forming the display pixels). In some examples, common electrodes on the touch screen can serve as touch sensing circuitry during a touch sensing phase, and can serve as display circuitry during a display phase. During the touch sensing phase of the touch screen, noise signal coupling from one touch node electrode to another can interfere with normal touch detection. Such noise signal coupling can be caused by parasitic capacitive pathways that can exist over a shared gate line electrically connected to display pixels in the respective touch node electrodes. The following description includes examples of reducing or eliminating the above noise signal coupling.

Figure 1A:
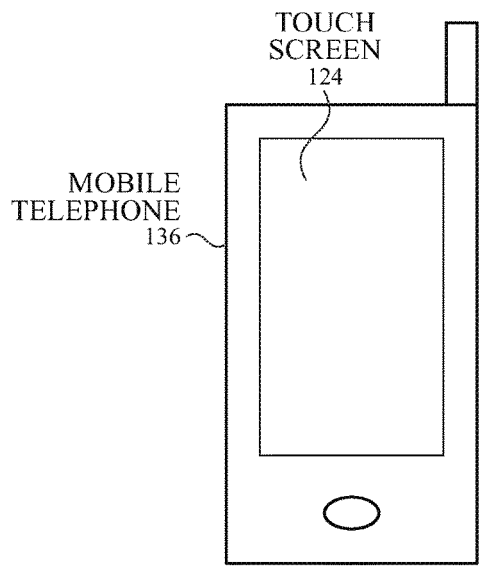
FIGS. 1A-1C illustrate an example mobile telephone, an example media player, and an example portable computing device that each include an exemplary touch screen according to examples of the disclosure.
Figure 1B:
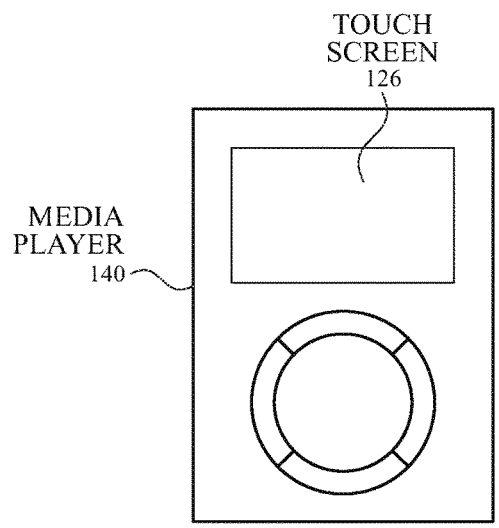
Figure 1C:
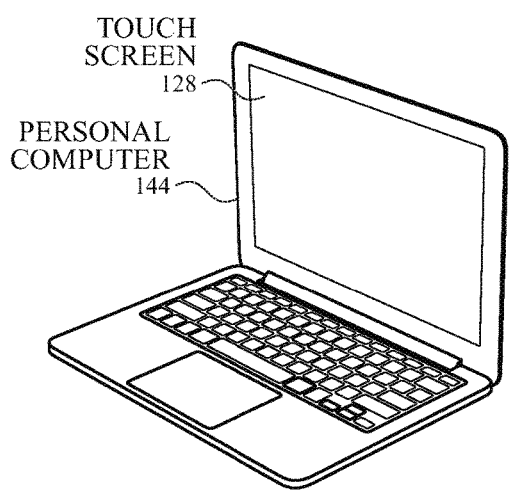

FIGS. 1A-1C show example systems in which a touch screen according to examples of the disclosure may be implemented. FIG. 1A illustrates an example mobile telephone 136 that includes a touch screen 124. FIG. 1B illustrates an example digital media player 140 that includes a touch screen 126. FIG. 1C illustrates an example portable computing device 144 that includes a touch screen 128. Touch screens 124, 126, and 128 can be based on self-capacitance. A self-capacitance based touch system can include a matrix of small, individual plates of conductive material that can be referred to as touch node electrodes (as described below with reference to touch screen 220 in FIG. 2). For example, a touch screen can include a plurality of individual touch node electrodes, each touch node electrode identifying or representing a unique location on the touch screen at which touch or proximity (i.e., a touch or proximity event) is to be sensed, and each touch node electrode being electrically isolated from the other touch node electrodes in the touch screen/panel. Such a touch screen can be referred to as a pixelated self-capacitance touch screen. During operation, a touch node electrode can be stimulated with an AC waveform, and the self-capacitance to ground of the touch node electrode can be measured. As an object approaches the touch node electrode, the self-capacitance to ground of the touch node electrode can change. This change in the self-capacitance of the touch node electrode can be detected and measured by the touch sensing system to determine the positions of multiple objects when they touch, or come in proximity to, the touch screen. In some examples, the electrodes of a self-capacitance based touch system can be formed from rows and columns of conductive material, and changes in the self-capacitance to ground of the rows and columns can be detected, similar to above. In some examples, a touch screen can be multi-touch, single touch, projection scan, full-imaging multi-touch, capacitive touch, etc.

In some examples, touch screens 124, 126 and 128 can be based on mutual capacitance. A mutual capacitance based touch system can include drive and sense lines that may cross over each other on different layers, or may be adjacent to each other on the same layer. The crossing or adjacent locations can be referred to as touch nodes. During operation, the drive line can be stimulated with an AC waveform and the mutual capacitance of the touch node can be measured. As an object approaches the touch node, the mutual capacitance of the touch node can change. This change in the mutual capacitance of the touch node can be detected and measured by the touch sensing system to determine the positions of multiple objects when they touch, or come in proximity to, the touch screen.

Figure 2:
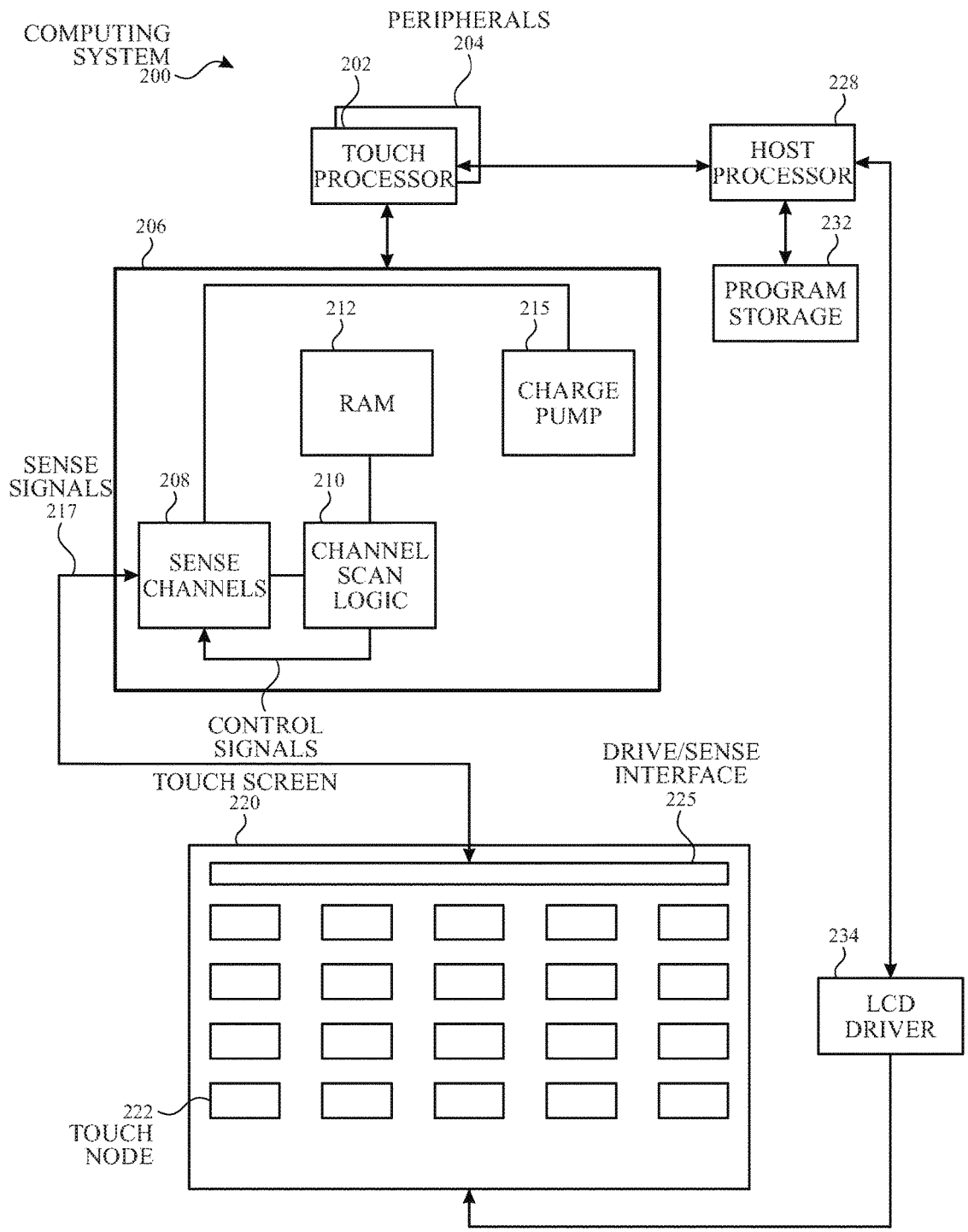
FIG. 2 is a block diagram of an example computing system that illustrates one implementation of an example self-capacitance touch screen according to examples of the disclosure.

FIG. 2 is a block diagram of an example computing system 200 that illustrates one implementation of an example self-capacitance touch screen 220 according to examples of the disclosure. Computing system 200 can be included in, for example, mobile telephone 136, digital media player 140, portable computing device 144, or any mobile or non-mobile computing device that includes a touch screen, including a wearable device. Computing system 200 can include a touch sensing system including one or more touch processors 202, peripherals 204, a touch controller 206, and touch sensing circuitry (described in more detail below). Peripherals 204 can include, but are not limited to, random access memory (RAM) or other types of memory or storage, watchdog timers and the like. Touch controller 206 can include, but is not limited to, one or more sense channels 208 and channel scan logic 210. Channel scan logic 210 can access RAM 212, autonomously read data from sense channels 208 and provide control for the sense channels. In addition, channel scan logic 210 can control sense channels 208 to generate stimulation signals at various frequencies and phases that can be selectively applied to the touch nodes of touch screen 220, as described in more detail below. In some examples, touch controller 206, touch processor 202 and peripherals 204 can be integrated into a single application specific integrated circuit (ASIC), and in some examples can be integrated with touch screen 220 itself.

Touch screen 220 can include touch sensing circuitry that can include a capacitive sensing medium having a plurality of electrically isolated touch node electrodes 222 (e.g., a pixelated self-capacitance touch screen). Touch node electrodes 222 can be coupled to sense channels 208 in touch controller 206, can be driven by stimulation signals from the sense channels through drive/sense interface 225, and can be sensed by the sense channels through the drive/sense interface as well, as described above. Labeling the conductive plates used to detect touch (i.e., touch node electrodes 222) as "touch node" electrodes can be particularly useful when touch screen 220 is viewed as capturing an "image" of touch. In other words, after touch controller 206 has determined an amount of touch detected at each touch node electrode 222 in touch screen 220, the pattern of touch node electrodes in the touch screen at which a touch occurred can be thought of as an "image" of touch (e.g., a pattern of fingers touching the touch screen).

Computing system 200 can also include a host processor 228 for receiving outputs from touch processor 202 and performing actions based on the outputs. For example, host processor 228 can be connected to program storage 232 and a display controller, such as an LCD driver 234. The LCD driver 234 can provide voltages on select (e.g., gate) lines to each pixel transistor and can provide data signals along data lines to these same transistors to control the pixel display image as described in more detail below. Host processor 228 can use LCD driver 234 to generate an image on touch screen 220, such as an image of a user interface (UI), and can use touch processor 202 and touch controller 206 to detect a touch on or near touch screen 220. The touch input can be used by computer programs stored in program storage 232 to perform actions that can include, but are not limited to, moving an object such as a cursor or pointer, scrolling or panning, adjusting control settings, opening a file or document, viewing a menu, making a selection, executing instructions, operating a peripheral device connected to the host device, answering a telephone call, placing a telephone call, terminating a telephone call, changing the volume or audio settings, storing information related to telephone communications such as addresses, frequently dialed numbers, received calls, missed calls, logging onto a computer or a computer network, permitting authorized individuals access to restricted areas of the computer or computer network, loading a user profile associated with a user's preferred arrangement of the computer desktop, permitting access to web content, launching a particular program, encrypting or decoding a message, and/or the like. Host processor 228 can also perform additional functions that may not be related to touch processing.

Note that one or more of the functions described herein, including the configuration of switches, can be performed by firmware stored in memory (e.g., one of the peripherals 204 in FIG. 2) and executed by touch processor 202, or stored in program storage 232 and executed by host processor 228. The firmware can also be stored and/or transported within any non-transitory computer-readable storage medium for use by or in connection with an instruction execution system, apparatus, or device, such as a computer-based system, processor-containing system, or other system that can fetch the instructions from the instruction execution system, apparatus, or device and execute the instructions. In the context of this document, a "non-transitory computer-readable storage medium" can be any medium (excluding signals) that can contain or store the program for use by or in connection with the instruction execution system, apparatus, or device. The computer-readable storage medium can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like.

The firmware can also be propagated within any transport medium for use by or in connection with an instruction execution system, apparatus, or device, such as a computer-based system, processor-containing system, or other system that can fetch the instructions from the instruction execution system, apparatus, or device and execute the instructions. In the context of this document, a "transport medium" can be any medium that can communicate, propagate or transport the program for use by or in connection with the instruction execution system, apparatus, or device. The transport medium can include, but is not limited to, an electronic, magnetic, optical, electromagnetic or infrared wired or wireless propagation medium.

Figure 3:
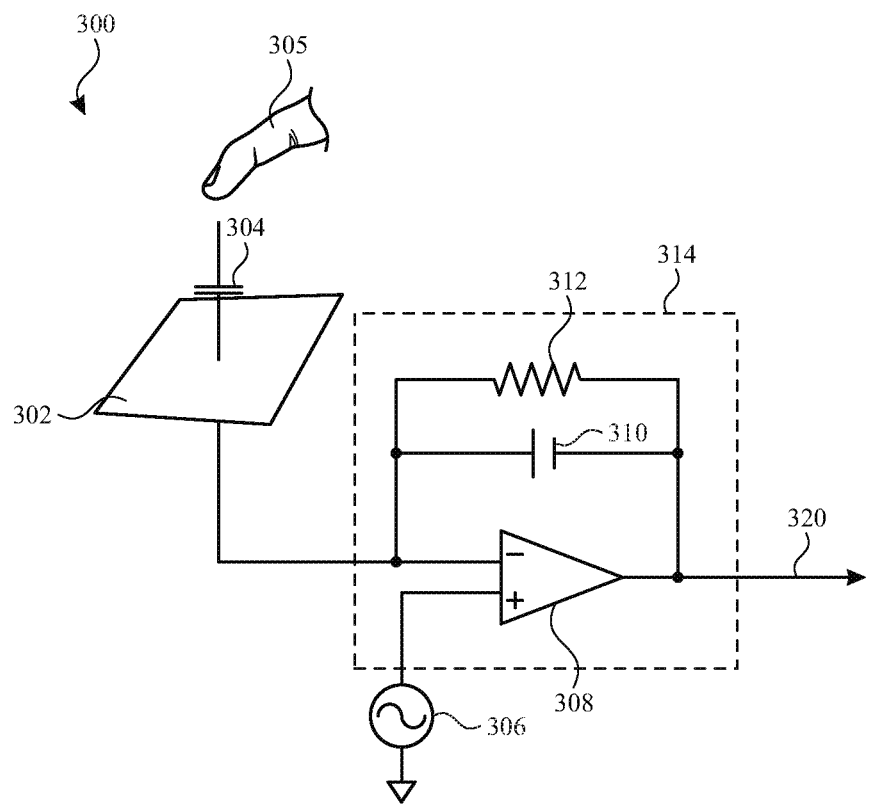
FIG. 3 illustrates an exemplary touch sensor circuit corresponding to a self-capacitance touch node electrode and sensing circuit according to examples of the disclosure.

FIG. 3 illustrates an exemplary touch sensor circuit 300 corresponding to a self-capacitance touch node electrode 302 and sensing circuit 314 according to examples of the disclosure. Touch node electrode 302 can correspond to touch node electrode 222. Touch node electrode 302 can have an inherent self-capacitance to ground associated with it, and also an additional self-capacitance to ground that is formed when an object, such as finger 305, is in proximity to or touching the electrode. The total self-capacitance to ground of touch node electrode 302 can be illustrated as capacitance 304. Touch node electrode 302 can be coupled to sensing circuit 314. Sensing circuit 314 can include an operational amplifier 308, feedback resistor 312 and feedback capacitor 310, although other configurations can be employed. For example, feedback resistor 312 can be replaced by a switched capacitor resistor in order to minimize any parasitic capacitance effect caused by a variable feedback resistor. Touch node electrode 302 can be coupled to the inverting input (−) of operational amplifier 308. An AC voltage source 306 (Vac) can be coupled to the non-inverting input (+) of operational amplifier 308. Touch sensor circuit 300 can be configured to sense changes in the total self-capacitance 304 of the touch node electrode 302 induced by a finger or object either touching or in proximity to the touch sensor panel. Output 320 can be used by a processor to determine the presence of a proximity or touch event, or the output can be inputted into a discrete logic network to determine the presence of a proximity or touch event.

Figure 4:
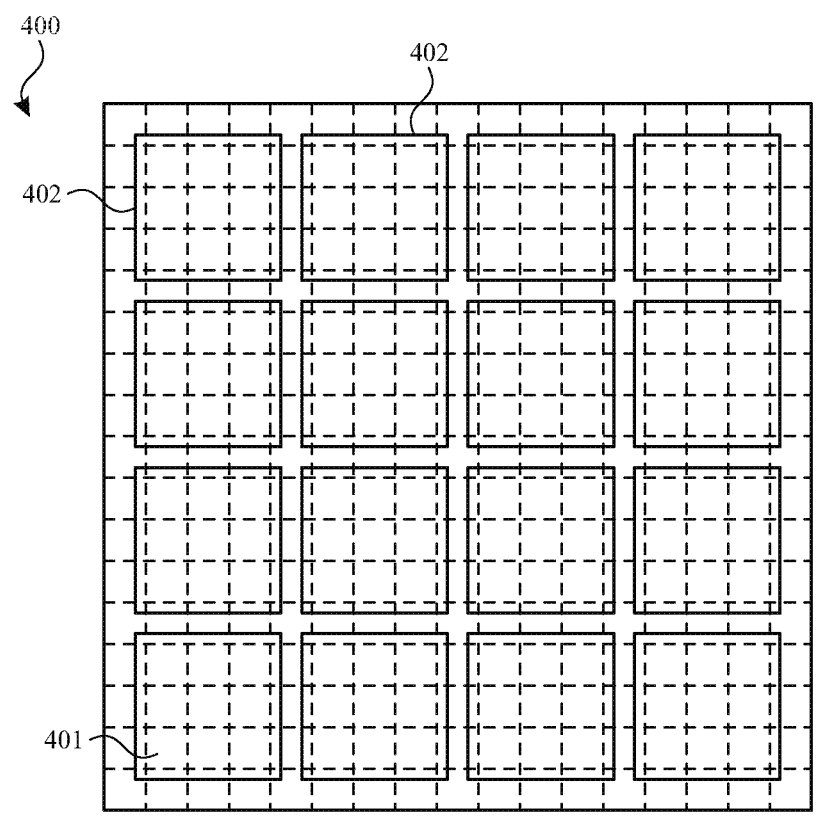
FIG. 4 illustrates an example configuration in which common electrodes can form portions of the touch sensing circuitry of a touch sensing system according to examples of the disclosure.

Referring back to FIG. 2, in some examples, touch screen 220 can be an integrated touch screen in which touch sensing circuit elements of the touch sensing system can be integrated into the display pixel stackups of a display. The circuit elements in touch screen 220 can include, for example, elements that can exist in LCD or other displays (e.g., Organic Light-Emitting Diode (OLED) displays), such as one or more pixel transistors (e.g., thin film transistors (TFTs)), gate lines, data lines, pixel electrodes and common electrodes. In any given display pixel, a voltage between a pixel electrode and a common electrode can control a luminance of the display pixel. The voltage on the pixel electrode can be supplied by a data line through a pixel transistor, which can be controlled by a gate line. It is noted that circuit elements are not limited to whole circuit components, such as a whole capacitor, a whole transistor, etc., but can include portions of circuitry, such as only one of the two plates of a parallel plate capacitor. FIG. 4 illustrates an example configuration in which common electrodes 402 can form portions of the touch sensing circuitry of a touch sensing system—in some examples of this disclosure, the common electrodes can form touch node electrodes used to detect an image of touch on touch screen 400, as described above. Each common electrode 402 can include a plurality of display pixels 401, and each display pixel 401 can include a portion of a common electrode 402, which can be a circuit element of the display system circuitry in the display pixel stackup (i.e., the stacked material layers forming the display pixels) of the display pixels of some types of LCDs or other displays (e.g., OLED displays)—in other words, the common electrodes can operate as part of the display system to display an image on touch screen 400.

In the example shown in FIG. 4, each common electrode 402 can serve as a multi-function circuit element that can operate as display circuitry of the display system of touch screen 400 and can also operate as touch sensing circuitry of the touch sensing system. Specifically, each common electrode 402 can operate as a common electrode of the display circuitry of the touch screen 400 (e.g., during a display phase), as described above, and can also operate as a touch node electrode of the touch sensing circuitry of the touch screen (e.g., during a touch sensing phase). Other circuit elements of touch screen 400 can also form part of the touch sensing circuitry. More specifically, in some examples, during the touch sensing phase, a gate line can be connected to a power supply, such as a charge pump, that can apply a voltage to maintain TFTs in display pixels included in a common electrode 402 in an "off" state. Stimulation signals can be applied to the common electrode 402. Changes in the total self-capacitance of the common electrode 402 can be sensed through one or more operational amplifiers, as previously discussed. The changes in the total self-capacitance of the common electrode 402 can depend on the proximity of an object, such as finger 305, to the common electrode. In this way, the measured changes in total self-capacitance of the common electrode 402 can provide an indication of touch on or near the touch screen.

In general, each of the touch sensing circuit elements may be either a multi-function circuit element that can form part of the touch sensing circuitry and can perform one or more other functions, such as forming part of the display circuitry, or may be a single-function circuit element that can operate as touch sensing circuitry only. Similarly, each of the display circuit elements may be either a multi-function circuit element that can operate as display circuitry and perform one or more other functions, such as operating as touch sensing circuitry, or may be a single-function circuit element that can operate as display circuitry only. Therefore, in some examples, some of the circuit elements in the display pixel stackups can be multi-function circuit elements and other circuit elements may be single-function circuit elements. In other examples, all of the circuit elements of the display pixel stackups may be single-function circuit elements.

In addition, although examples herein may describe the display circuitry as operating during a display phase, and describe the touch sensing circuitry as operating during a touch sensing phase, it should be understood that a display phase and a touch sensing phase may be operated at the same time, e.g., partially or completely overlapping, or the display phase and touch sensing phase may operate at different times. Also, although examples herein describe certain circuit elements as being multi-function and other circuit elements as being single-function, it should be understood that the circuit elements are not limited to the particular functionality in other examples. In other words, a circuit element that is described in one example herein as a single-function circuit element may be configured as a multi-function circuit element in other examples, and vice versa.

The common electrodes 402 (i.e., touch node electrodes) and display pixels 401 of FIG. 4 are shown as rectangular or square regions on touch screen 400. However, it is understood that the common electrodes 402 and display pixels 401 are not limited to the shapes, orientations, and positions shown, but can include any suitable configurations according to examples of the disclosure. Further, the examples of the disclosure will be provided in the context of a touch screen, but it is understood that the examples of the disclosure can similarly be implemented in the context of a touch sensor panel.

Figure 5:
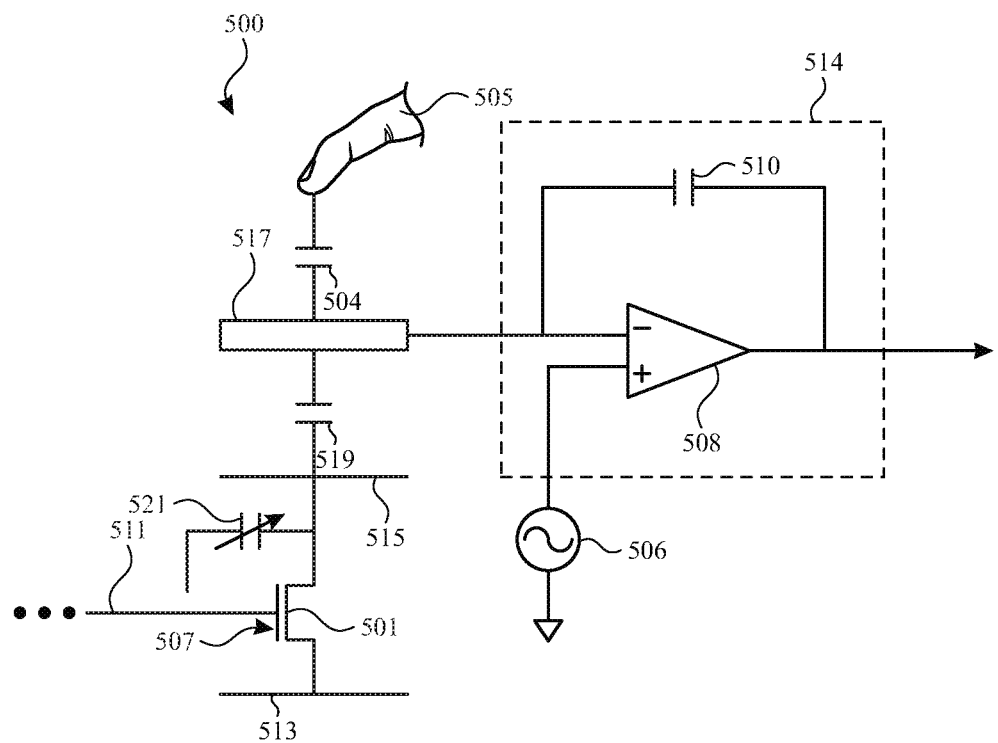
FIG. 5 shows a partial circuit diagram of some of the display and touch sensing circuitry within a display pixel of an example touch screen according to examples of the disclosure.

FIG. 5 shows a partial circuit diagram 500 of some of the display and touch sensing circuitry within display pixel 501 of an example touch screen according to examples of the disclosure. For the sake of clarity, only one display pixel structure is shown. However, it is understood that other display pixels of the touch screen can include the same or similar display and touch sensing circuitry as described below for display pixel 501. Thus, the description of the operation of display pixel 501 can be considered a description of the operation of the touch screen, in general.

Display pixel 501 can include TFT 507, gate line 511, data line 513, pixel electrode 515, and common electrode 517. TFT 507 can be a transistor that controls the light output of a display pixel in any kind of touch screen, such as an LCD or OLED integrated touch screen. Common electrode 517 can correspond to any one of touch node electrodes 222 in FIG. 2, touch node electrode 302 in FIG. 3 and/or common electrodes 402 in FIG. 4. Gate line 511 can supply one or more voltages to the gate terminal of TFT 507 to control the operational state of the TFT (e.g., "on" or "off"), and data line 513 can supply one or more voltages for setting the voltage on pixel electrode 515. In some examples, gate line 511 can be shared by more than one display pixel (i.e., the gate line can be connected to the gate terminal of more than one display TFT), though a single display pixel is shown for simplicity. Storage capacitance 519 can exist between common electrode 517 and pixel electrode 515, and can store a charge—set by the voltage difference between data line 513 and common electrode 517—for controlling a luminance of display pixel 501. Specifically, a liquid crystal element (which may include, for example, a series of liquid crystal molecules) can be situated between common electrode 517 and pixel electrode 515. An electric field may be generated between common electrode 517 and pixel electrode 515 based on the voltage difference between common electrode 517 and pixel electrode 515. The amount that the liquid crystal element rotates (e.g., twists or untwists) can depend on the strength of the electric field, which, in turn, can depend on the voltage difference between common electrode 517 and pixel electrode 515. In some examples, offset capacitance 521 (or "parasitic capacitance") can exist between the drain terminal of TFT 507 and the gate terminal of the TFT, and can be referred to as $C_{gp}$ (i.e., gate-to-pixel capacitance). $C_{gp}$ 521 can vary based on the voltage difference between gate line 511 and pixel electrode 515, and can include capacitances such as the gate-to-drain capacitance of TFT 507 and/or other capacitances due to the layout of various components of the touch screen. Because the voltage at pixel electrode 515 can change based on the image displayed by the touch screen, $C_{gp}$ 521 can change based on the image displayed by the touch screen (i.e., $C_{gp}$ can be "image-dependent"). Operational amplifier 508 can be configured to sense changes in the total self-capacitance of common electrode 517, as described above, to determine the presence of a proximity or touch event at the common electrode. Although display pixel 501 has been described as including a single TFT (i.e., TFT 507), in some examples, the display pixel may include more than a single TFT. For example, display pixel 501 can include two TFTs connected in series, the gate terminals of which can both be connected to gate line 511. The operation of such display pixels can be substantially the same as the operation of display pixel 501 of FIG. 5. For ease of description, the examples of the disclosure will be described with reference to the display pixel configuration of FIG. 5, although it is understood that the scope of the disclosure is not so limited.

During a touch sensing phase of the touch screen, gate line 511 can supply a voltage to the gate of TFT 507 for turning "off" the TFT. Operational amplifier 508 can sense changes in the total self-capacitance of common electrode 517. As described above, this total self-capacitance can include a touch capacitance 504 due to an object, such as finger 505, being in proximity to or touching common electrode 517, as well as any other capacitance that may be seen at the common electrode. In some examples, the total self-capacitance seen at common electrode 517 can include storage capacitance 519 in series with $C_{gp}$ 521. In some examples, storage capacitance 519 can be much larger than $C_{gp}$ 521, and can thus dominate the non-touch-related total capacitance seen at common electrode 517. As such, the total self-capacitance seen at common electrode 517 can be approximately a combination of touch capacitance 504 and $C_{gp}$ 521.

In self-capacitance touch screens, any capacitance seen by a self-capacitance touch node electrode can affect the total self-capacitance measured at that touch node electrode, and can thus affect touch measurements at that touch node electrode. Therefore, in some examples, it can be beneficial to "bootstrap" the touch screen in order to reduce or cancel any unwanted capacitances that may contribute to the total self-capacitance measured at a touch node electrode. "Bootstrapping" the touch screen can entail driving one or more portions of a touch screen with a voltage at the same frequency and phase as is used to drive and sense a touch node electrode (as described above), so that capacitances that may exist between the touch node electrode and the one or more portions of the touch screen can be effectively canceled. For example, the gate line of a display pixel (such as gate line 511 of display pixel 501) can be driven with a voltage at the same frequency and phase as is used to drive and sense the common electrode of the display pixel (such as common electrode 517 of display pixel 501) during a touch sensing phase of the touch screen, and thus effectively cancel the effect of the gate-to-pixel capacitance (such as $C_{gp}$ 521 of display pixel 501) on the touch sensing performance of the touch screen.

Figure 6A:
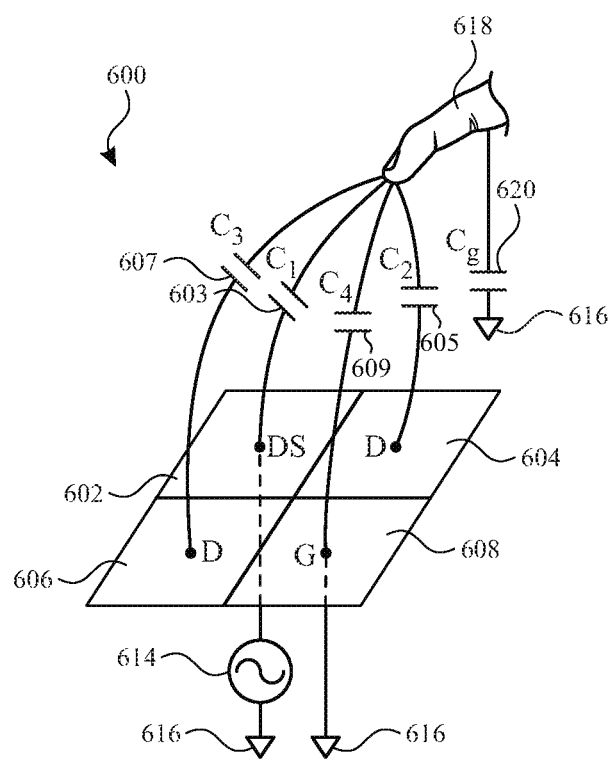
FIG. 6A illustrates an exemplary partially bootstrapped touch screen in which less than all of the touch node electrodes can be driven and sensed simultaneously according to examples of the disclosure.

FIG. 6A illustrates an exemplary partially bootstrapped touch screen 600 in which less than all of the touch node electrodes can be driven and sensed simultaneously according to examples of the disclosure. Touch screen 600 can include touch node electrodes 602, 604, 606 and 608. Touch node electrodes 602, 604, 606 and 608 can be a portion of the touch node electrodes that can be included in touch screen 600. Other touch node electrodes are omitted for ease of description, but it is understood that the scope of the disclosure includes touch screens that include more than four touch node electrodes.

Touch node electrode 602 can be driven and sensed (signified by "DS") simultaneously with a stimulation signal from stimulation source 614, which can be coupled to the system ground 616 of whichever device touch screen 600 can be included in (e.g., any of the devices illustrated in FIGS. 1A-1C). Stimulation source 614 can correspond to sensing circuit 314 and/or voltage source 306 in FIG. 3A, for example.

Finger 618 can have capacitance $C_{body}$ between it and earth ground, where $C_{body}$ can represent a human body to earth ground capacitance, for example. Finger 618 can also have capacitance $C_{F-SG}$ between it and the device in which touch screen 600 can be included, where $C_{F-SG}$ can represent a finger-to-system (device) ground capacitance. The device in which touch screen 600 can be included can have capacitance $C_{SG-EG}$ between it and earth ground, where $C_{SG-EG}$ can represent a system (device) ground-to-earth ground capacitance. In some examples, $C_{body}$ can be much larger than $C_{F-SG}$ and $C_{SG-EG}$. Thus, finger 618 can be considered to be effectively shorted to earth ground through $C_{body}$. Therefore, $C_{SG-EG}$ can be considered to be between system (device) ground and finger 618 (which can be shorted to earth ground), and, from before, $C_{F-SG}$ can be another capacitance between system (device) ground and finger 618. As a result, $C_{F-SG}$ and $C_{SG-EG}$ can be parallel capacitances that can exist between finger 618 and system ground 616. $C_g$ 620, a total capacitance between finger 618 and system ground, can then be expressed as:

$$C_g = C_{F-SG} + C_{SG-EG} \quad (1)$$

Current from touch node electrodes 602, 604, 606 and 608 can flow through finger 618 and $C_g$ 620 to system ground 616. However, because an impedance associated with $C_g$ 620 can at least partially isolate finger 618 from system ground 616, the voltage at finger 618 can move further and further away from system ground 616 as more current flows from touch node electrodes 602, 604, 606 and 608 through finger 618 to system ground 616.

In touch screen 600, only touch node electrode 602 can be driven and sensed. Touch node electrodes 604 and 606 can be driven but not sensed, and touch node electrode 608 can be grounded to system ground 616. Though not illustrated for clarity, touch node electrodes 604 and 606 can be coupled to a stimulation source to be driven by the same stimulation signal as can be driving touch node electrode 602. Additionally, it is understood that in touch screens that have more touch node electrodes than those illustrated in FIG. 6A, the DS, D and G touch node electrode pattern can be repeated across some or all of the touch screen in accordance with the examples of the disclosure, as will be described in more detail below.

Partially bootstrapped touch screen 600 can exhibit some capacitance-related benefits. Specifically, capacitances between touch node electrode 602 (the touch node electrode of interest—i.e., the touch node electrode for which the total self-capacitance is being sensed) and touch node electrodes 604 and 606 can be effectively canceled, because touch node electrodes 602, 604 and 606 can be driven with the same stimulation signal. Capacitances between touch node electrode 602 and touch node electrode 608 may not be canceled, because touch node electrode 608 can be coupled to system ground 616; however, because touch node electrodes 602 and 608 can be diagonally disposed with respect to one another, any capacitances that may exist between the two can be relatively small. Therefore, the total self-capacitance sensed at touch node electrode 602 can be substantially free of capacitances that may exist between touch node electrode 602 and the other touch node electrodes.

Partially bootstrapped touch screen 600 can also exhibit a relatively small amount of touch signal attenuation. Specifically, the current from the touch node electrodes to ground can flow through $C_4$ 609 to system ground 616 as well as through finger 618 and $C_g$ 620. Therefore, the voltage at finger 618 can be brought down relatively close to system ground 616, which can result in a relatively large voltage being dropped across $C_1$ 603; thus, relatively large charge coupling and relatively small attenuation of $C_1$ 603 can be sensed at touch node electrode 602. The partially bootstrapped touch screen attenuation factor can be expressed as:

$$\alpha = (C_g + C_4)/C_{Total} \quad (2)$$

The effective self-capacitance sensed at touch node electrode 602 can be expressed as:

$$C_{Eff,1} = \alpha * C_1 \quad (3)$$

In examples in which touch screen 600 includes more touch node electrodes that are being driven, sensed, and grounded in the illustrated pattern, and in which many parts of a user's hand are in proximity to/touching the touch screen (e.g., the user's palm, thumb and many fingers touching the touch screen), the attenuation factor can be ~25% in the partially bootstrapped touch screen.

Figure 6B:
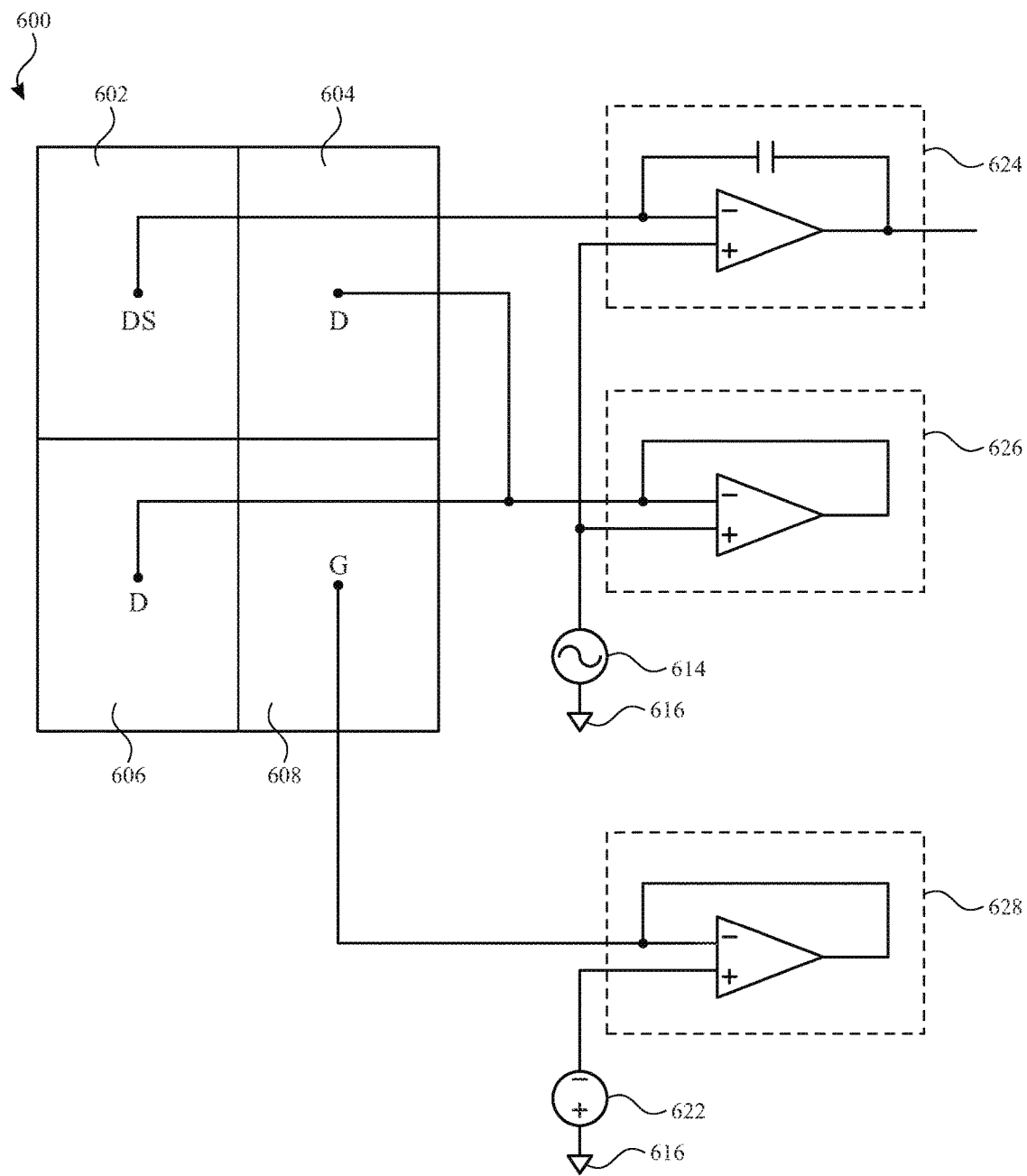
FIG. 6B illustrates an exemplary configuration of a partially bootstrapped touch screen having touch node electrodes coupled to appropriate circuitry according to examples of the disclosure.

The touch node electrodes of the touch screen of the disclosure can be driven, sensed and/or grounded using any appropriate circuitry. FIG. 6B illustrates an exemplary configuration of partially bootstrapped touch screen 600 having touch node electrodes coupled to appropriate circuitry according to examples of the disclosure. Touch screen 600 can correspond to touch screen 220 in FIG. 2 or touch screen 600 in FIG. 6A, for example. Touch node electrode 602, which can be driven and sensed, can be coupled to sense circuitry 624. Sense circuitry 624 can correspond to sense circuitry 314 in FIG. 3, for example. Touch node electrodes 604 and 606, which can be driven but not sensed, can be coupled to stimulation buffer 626. In some examples, sense circuitry 624 and stimulation buffer 626 can share stimulation source 614, because touch node electrodes 602, 604 and 606 can be driven by the same stimulation signal; it is understood, however, that the sense circuitry and the stimulation buffer need not necessarily share the same stimulation source. Touch node electrode 608, which can be grounded, can be coupled to AC ground buffer 628. Voltage source 622 can provide a DC bias to the AC ground provided by AC ground buffer 628. In some examples, sense circuitry 624, stimulation buffer 626 and/or AC ground buffer 628 can be included in touch controller 206 in FIG. 2, and in some examples, in sense channels 208. Further, sense circuitry 624, stimulation buffer 626 and/or AC ground buffer 628 are provided as examples only, and it is understood that other circuitry can be utilized to similarly drive, sense and ground the touch node electrodes of the disclosure.

Figure 6C:
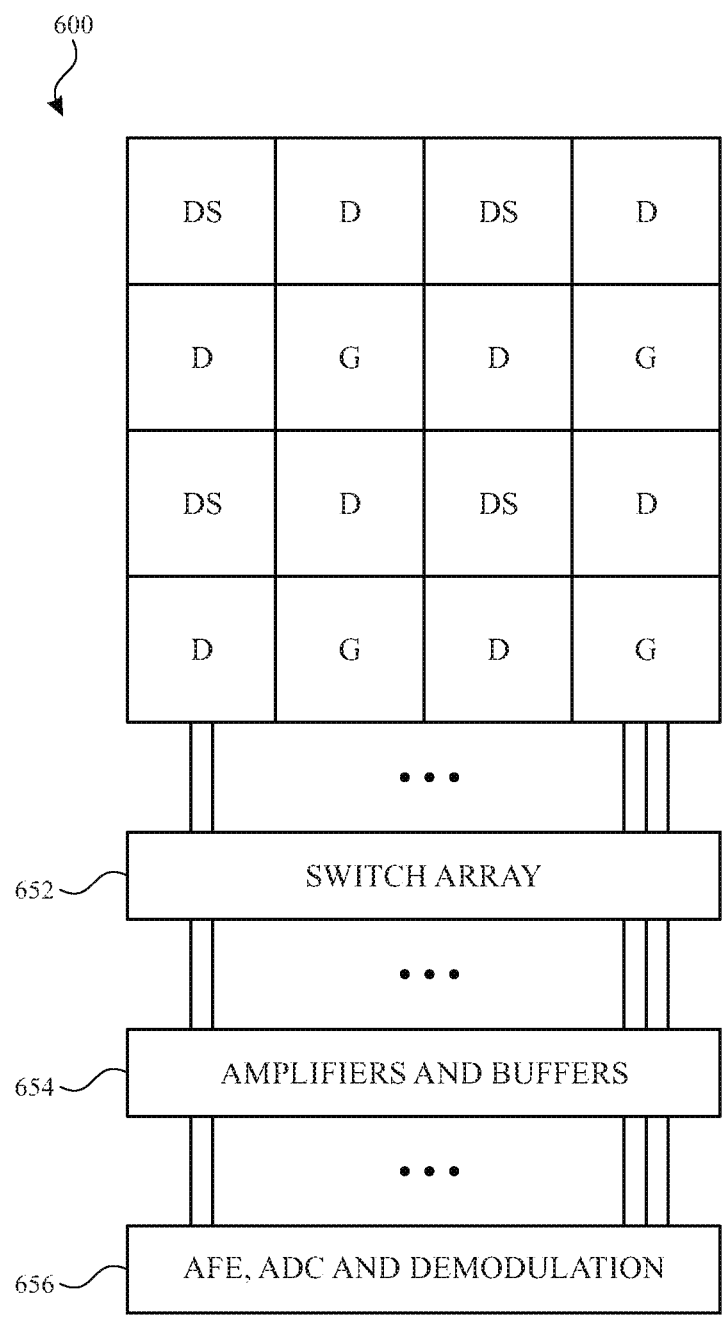
FIG. 6C illustrates an exemplary configuration of a partially bootstrapped touch screen that can utilize a switch array to couple appropriate circuitry to touch node electrodes according to examples of the disclosure.

FIG. 6C illustrates an exemplary configuration of partially bootstrapped touch screen 600 that can utilize switch array 652 to couple appropriate circuitry to touch node electrodes according to examples of the disclosure. Touch node electrodes in touch screen 600 can be coupled to switch array 652. Switch array 652 can be coupled to amplifier circuitry 654, which can include circuitry such as sense circuitry/circuitries 624, stimulation buffer(s) 626 and AC ground buffer(s) 628 illustrated in FIG. 6B. Amplifier circuitry section 654 can be coupled to touch processing circuitry 656, such as analog front-ends (AFEs), analog-to-digital converters (ADCs) and demodulation circuits for processing touch signals detected on touch screen 600.

Circuitry such as sense circuitry 624, stimulation buffer 626 and AC ground buffer 628 need not be permanently coupled to the touch node electrodes for proper touch screen operation. Instead, such circuitry can be coupled to the touch node electrodes through switch array 652 such that appropriate touch node electrodes can be coupled to appropriate circuitry only when needed. This can allow multiple touch node electrodes to share common circuitry, which can reduce the amount of circuitry needed for touch screen operation. For example, a first touch node electrode that is to be driven and sensed (a first DS touch node electrode) can be coupled to sense circuitry 624 using switch array 652. When a second touch node electrode is to be driven and sensed (a second DS touch node electrode), switch array can couple that same sense circuitry 624 to the second touch node electrode to drive and sense the second touch node electrode instead of the first touch node electrode. Such switch array 652 operation can analogously apply to couple stimulation buffers 626, AC ground buffers 628, and any other appropriate circuitry to appropriate touch node electrodes. Switch array 652 can be any suitable switching network that can couple touch node electrodes to appropriate circuitry in amplifier circuitry section 654.

In some examples, touch node electrodes on touch screen 600 can be stimulated in a single stimulation configuration (e.g., a sense circuitry 624 in amplifier circuitry section 654 can stimulate and sense a single touch node electrode at any moment in time). In some examples, touch node electrodes on touch screen 600 can be stimulated in a multi-stimulation configuration (e.g., a sense circuitry 624 in amplifier circuitry section 654 can stimulate and sense multiple touch node electrodes at any moment in time). In a multi-stimulation configuration, any suitable multi-stimulation scheme can be utilized and implemented using switch array 652, as appropriate. For example, a Hadamard/Circulant matrix driving and sensing scheme can be utilized with receive-side coding in which the distribution of touch node electrodes that receive a positive phase stimulation signal and touch node electrodes that receive a negative phase stimulation signal can be equal for each touch scanning step, except for a common mode touch scanning step.

As illustrated in FIGS. 6A-6B, at any one moment in time, it can be the case that only one out of every four touch node electrodes can be driven and sensed. Thus, only one-fourth of the total self-capacitance touch image can be captured. Thus, it can be beneficial to drive, sense and/or ground every touch node electrode at some point in time so as to capture a full self-capacitance touch image on the touch screen. An exemplary self-capacitance scan scheme will be described below. It should be noted that the examples of the disclosure can be extended to other partially bootstrapped schemes in which different numbers and arrangements of touch node electrodes can be driven and sensed, driven but not sensed, and grounded; however, the examples of the disclosure will focus on the four-pixel configurations provided for ease of description.

Figure 6D:
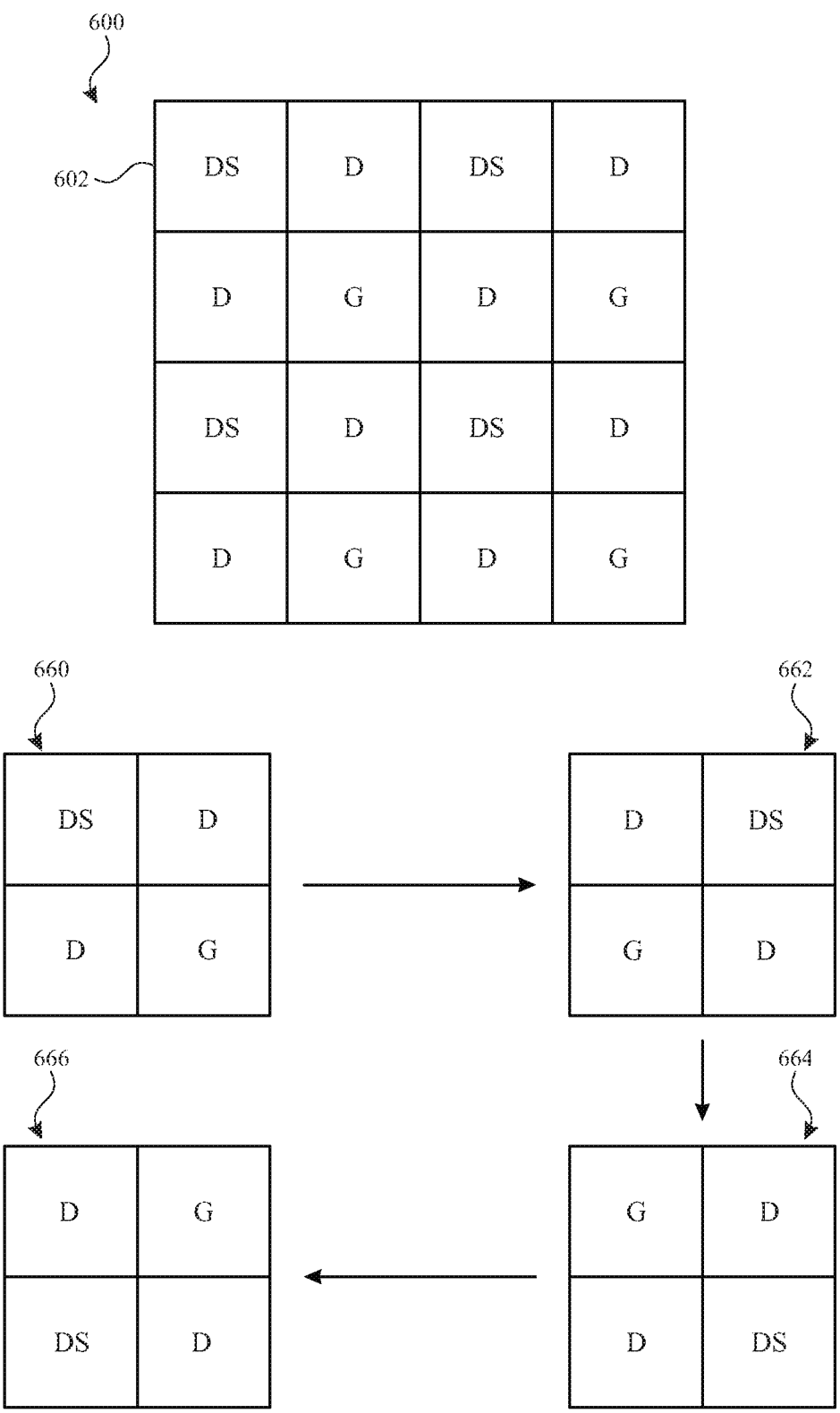
FIG. 6D illustrates an exemplary partially bootstrapped scan on a touch screen according to examples of the disclosure.

FIG. 6D illustrates an exemplary partially bootstrapped scan on touch screen 600 according to examples of the disclosure. The partially bootstrapped scan illustrated in FIG. 6D can be substantially similar to the partially bootstrapped scans illustrated in FIGS. 6A-6C. In some examples, the partially bootstrapped scan can proceed in at least four steps, during which different ones of touch node electrodes 602 in a group of four touch node electrodes can be driven and sensed, driven but not sensed, and grounded. Specifically, in a first step 660, an upper-left touch node electrode 602 can be driven and sensed, a lower-right touch node electrode can be grounded, and the remaining two touch node electrodes (lower-left and upper-right) can be driven but not sensed. The second 662, third 664 and fourth 666 steps can drive and sense, drive but not sense, and ground different permutations of touch node electrodes, as illustrated, such that at the end of the fourth step, all of the touch node electrodes in the group of four touch node electrodes has been driven and sensed at some point in time. The order of scan steps provided is exemplary only, and it is understood that a different order of scan steps could be utilized.

Figure 7A:
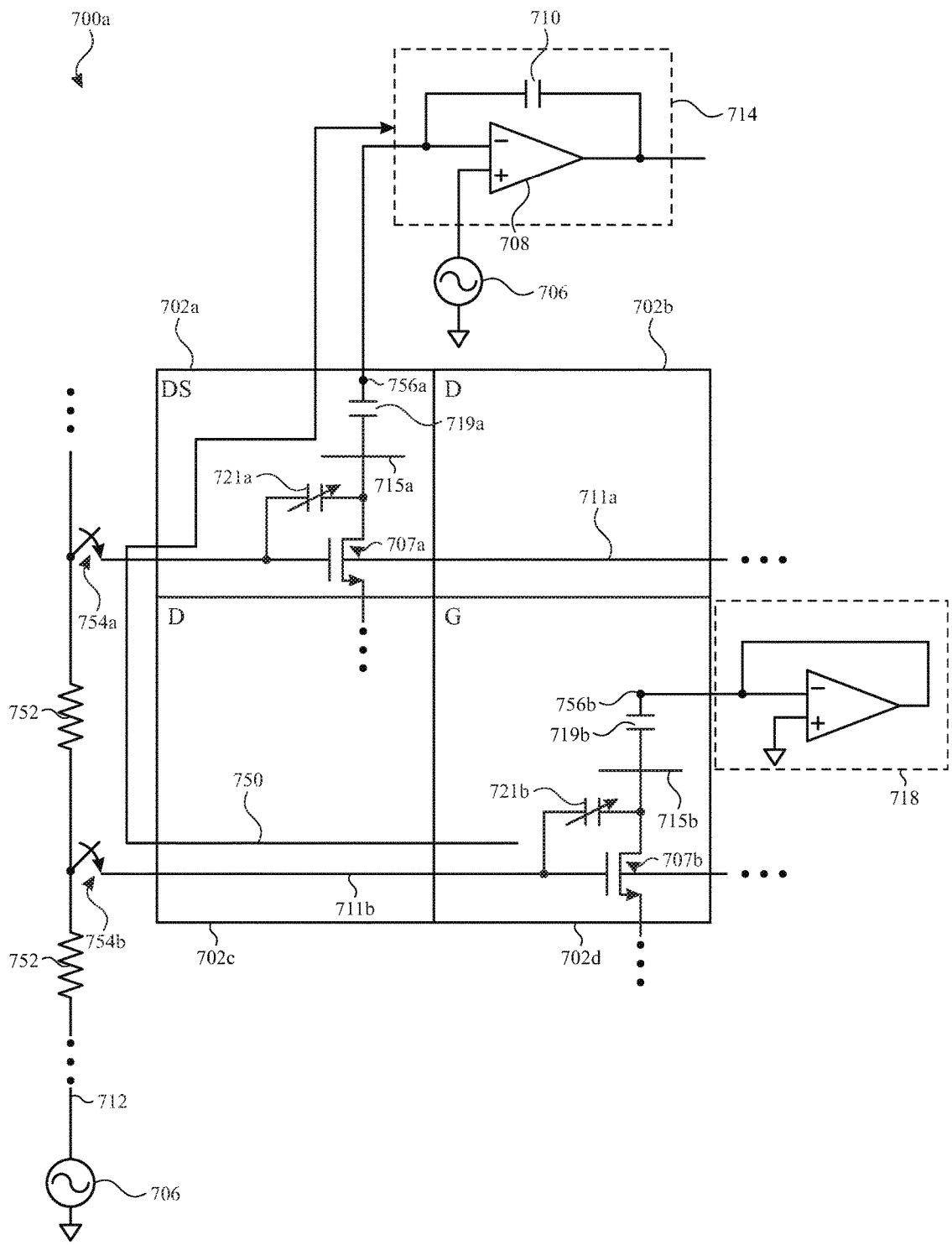
FIG. 7A illustrates an exemplary touch screen configuration in which gate lines for display pixels in different rows of the touch screen are coupled to the same gate line routing according to examples of the disclosure.

FIG. 7A illustrates an exemplary touch screen 700a configuration in which gate lines 711 for display pixels in different rows of the touch screen are coupled to the same gate line routing 712 according to examples of the disclosure. Touch screen 700a can correspond to the touch screens previously described, and can be operated in a partially bootstrapped configuration as described with reference to FIGS. 6A-6D. In particular, touch node electrode 702a can be driven and sensed, touch node electrodes 702b and 702c can be driven but not sensed, and touch node electrode 702d can be grounded. The scan configuration illustrated in FIG. 7A can correspond to a first of four partially bootstrapped scan steps, as described with reference to FIG. 6D.

Touch screen 700a can be an integrated touch screen, and thus touch node electrodes 702 can each be coupled to display pixel circuitry as well as touch sensing circuitry in the manner described with reference to FIG. 5. For example, touch node electrode 702a can be capacitively coupled at 756a to pixel electrode 715a via storage capacitance 719a. Pixel electrode 715a can be coupled to pixel TFT 707a, which can be coupled to gate line 711a. Pixel TFT 707a can be a transistor that controls the light output of a display pixel in any kind of touch screen, such as an LCD or OLED integrated touch screen. $C_{gp}$ 721a can exist between gate line 711a and pixel electrode 715a, and can be image-dependent.

The operation of the above display pixel circuitry can be as described with reference to FIG. 5. Touch node electrode 702a can also be coupled to sense circuitry 714, which can correspond to sense circuitry 314 in FIG. 3 and sense circuitry 514 in FIG. 5, the details of which will be omitted here for brevity.

Touch node electrode 702d, which can be grounded, can also be coupled at 756b to display pixel circuitry as described with reference to touch node electrode 702a, the details of which will not be repeated for brevity. Touch node electrode 702d can also be coupled at 756b to AC ground buffer 718, which can correspond to AC ground buffer 628 in FIG. 6B. Touch node electrodes 702b and 702c can similarly be coupled to display pixel circuitry, and can also be coupled to a stimulation buffer(s) (e.g., stimulation buffer 626 in FIG. 6B), but the details will be omitted here for ease of description.

Gate line 711a can be coupled to gate line routing 712 via switch 754a, and gate line 711b can be coupled to the gate line routing via switch 754b. Gate line 711a can also be coupled to pixel TFT 707a, as well as other pixel TFTs in the same row as touch node electrode 702a (e.g., a pixel TFT for touch node electrode 702b). Gate line 711b can similarly also be coupled to pixel TFT 707b, as well as other pixel TFTs in the same row as touch node electrode 702d (e.g., a pixel TFT for touch node electrode 702c). Pixel TFT 707b can be a transistor that controls the light output of a display pixel in any kind of touch screen, such as an LCD or OLED integrated touch screen. Gate line routing 712 can be coupled to stimulation source 706 for bootstrapping gate lines 711a and 711b, as described previously, and can have a resistance that can be illustrated by distributed resistances 752.

During a touch sensing phase of the touch screen, switches 754 can be closed (e.g., controlled by touch controller 206 in FIG. 2), and a DC voltage on gate line routing 712, and thus gate lines 711, can be such that pixel TFTs 707 can be off. Further, an AC voltage can be provided on gate line routing 712 by stimulation source 706, and thus gate lines 711, to bootstrap the gate lines. While touch node electrodes 702a, 702b and 702c can also have the same or similar AC voltages applied to them, because touch node electrodes 702a, 702b and 702c can be driven and/or sensed, touch node electrode 702d may not, as touch node electrode 702d can be grounded, as previously discussed. Therefore, pixel electrode 715b can also be relatively grounded via capacitance 719b. Consequently, the AC voltage on gate line 711b can cause a relatively large voltage change across $C_{gp}$ 721b. Additionally, as previously discussed, $C_{gp}$ 721b can be image-dependent, and thus can change during the display phase(s) of touch screen 700a. Such changes in $C_{gp}$ 721b can cause unpredictable and irregular noise signals to be injected onto gate line 711b. These noise signals can be transferred to gate line 711a via gate line routing 712, because the path from gate line 711b to gate line 711a can have a lower resistance than the path from gate line 711b to stimulation source 706. Once transferred to gate line 711a, the noise signals can be transferred to sense circuitry 714 via $C_{gp}$ 721a and storage capacitance 719a, and can be erroneously detected as touch-related signals, causing inaccuracies in touch system performance. The above-described path of the noise signals from $C_{gp}$ 721b to sense circuitry 714 is illustrated as path 750 in FIG. 7A. It is understood that each touch node electrode can include multiple display pixels, as discussed with reference to FIG. 4, though a single display pixel is illustrated for ease of description.

As previously discussed, touch screen 700a can include more touch node electrodes than those illustrated, and can include multiple touch node electrodes that are grounded, as described with reference to FIGS. 6A-6D. In some examples, the gate lines of many or all of those touch node electrodes can be coupled together via gate line routing 712, which can make the above-described noise signal issue even more prevalent and cause greater touch sensing inaccuracies. Therefore, it can be beneficial to decouple the gate lines of touch node electrodes that are grounded (e.g., touch node electrode 702d) from those touch node electrodes that are being sensed (e.g., touch node electrode 702a).

Figure 7B:
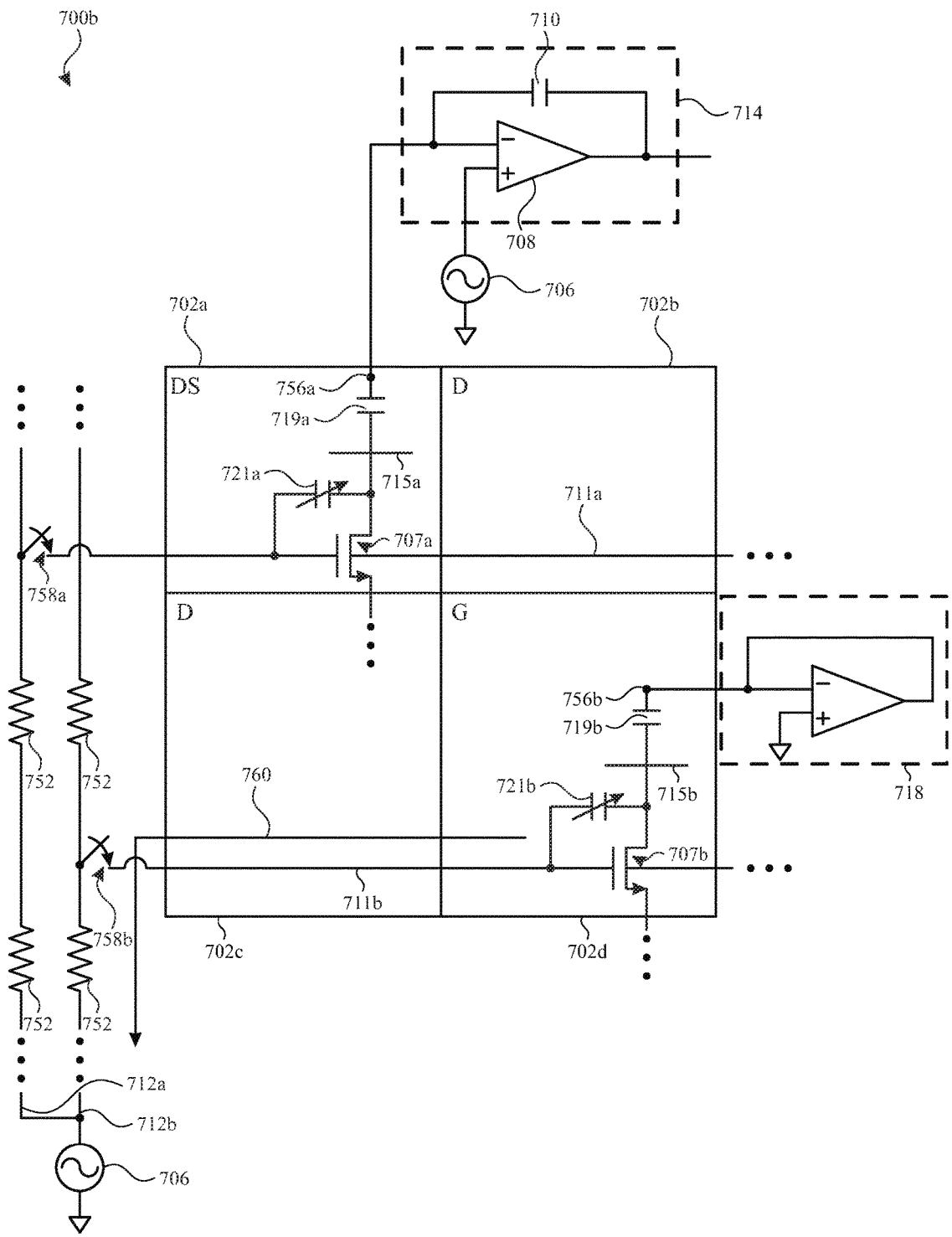
FIG. 7B illustrates an exemplary touch screen configuration in which gate lines for display pixels in different rows of the touch screen are coupled to different gate line routings according to examples of the disclosure.

FIG. 7B illustrates an exemplary touch screen 700b configuration in which gate lines 711 for display pixels in different rows of the touch screen are coupled to different gate line routings 712 according to examples of the disclosure. The configuration of FIG. 7B can be substantially that of FIG. 7A, except that while the configuration of FIG. 7A can include single gate line routing 712, the configuration of FIG. 7B can include dual gate line routing—gate line routing 712a and gate line routing 712b. Gate line routing 712a and 712b can be coupled to stimulation source 706. Gate line routing 712a can be coupled to gate line 711a (and thus to pixel TFT 707a) via switch 758a, and gate line routing 712b can be coupled to gate line 711b (and thus to pixel TFT 707b) via switch 758b. More generally, every other gate line 711 can be coupled to gate line routing 712a, and the remaining gate lines 711 can be coupled to gate line routing 712b (e.g., odd-row gate lines can be coupled to gate line routing 712a, and even-row gate lines can be coupled to gate line routing 712b). Additionally, as previously described, in the partially bootstrapped scans of the disclosure, the touch node electrodes to be driven and sensed and the touch node electrodes to be grounded can always be diagonally disposed with respect to one another, and thus can always be disposed in different rows of touch node electrodes. As such, the respective gate lines of touch node electrodes to be grounded can always be coupled to different gate line routing than the respective gate lines of touch node electrodes to be driven and sensed. Therefore, the coupling pathway for noise injected from the grounded touch node electrodes to the driven and sensed touch node electrodes can be severed, and such noise transmission can be reduced or eliminated.

Specifically, referring to FIG. 7B, noise signals generated by $C_{gp}$ 721b in touch node electrode 702d can be injected to gate line 711b. Gate line 711b can be coupled to gate line routing 712b, which can also be coupled to other gates lines that can be coupled to other grounded touch node electrodes, but not coupled to touch node electrodes that are being driven and sensed. The noise signals from $C_{gp}$ 721b can propagate down gate line routing 712b to stimulation source 706, at which point the noise signals can be shunted to low impedance stimulation source 706, rather than propagating back up gate line routing 712a to touch node electrode 702a and sense circuitry 714—gate line routing 712a can present higher impedance to the noise signals as compared with stimulation source 706. As such, the coupling pathway via gate line routing 712 for noise signals between grounded touch node electrodes 702 and driven and sensed touch node electrodes can be substantially severed. These noise signals can, therefore, be substantially prevented from negatively affecting touch sensing operation of touch screen 700b.

Figure 7C:
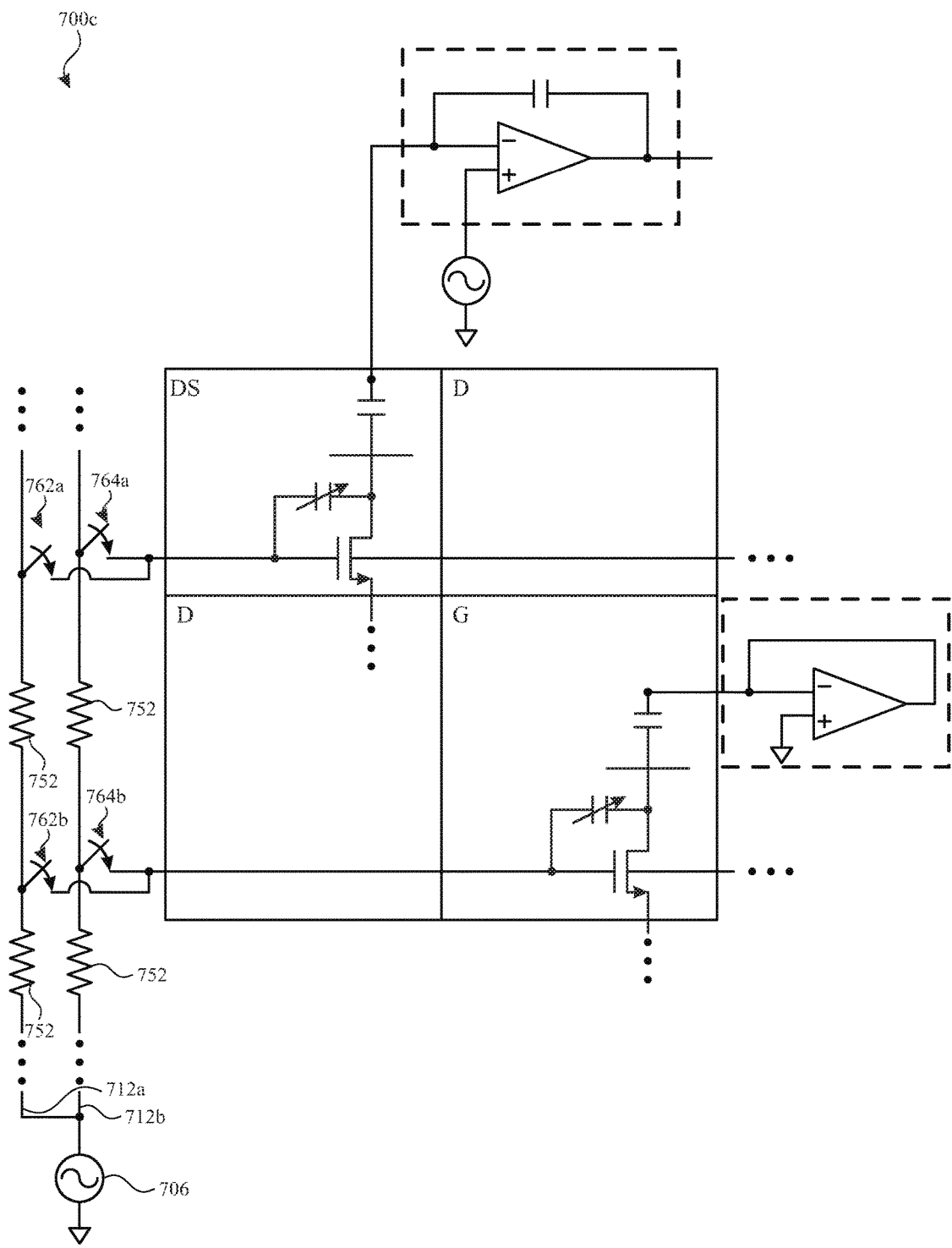
FIG. 7C illustrates an exemplary touch screen configuration in which gate lines for display pixels can be dynamically coupled to appropriate gate line routings according to examples of the disclosure.

In some examples, the gate line routing to which a particular gate line is coupled can be determined dynamically by, for example, touch controller 206 in FIG. 2, based on the configuration of the touch screen scan being performed. FIG. 7C illustrates an exemplary touch screen 700c configuration in which gate lines 711 for display pixels can be dynamically coupled to appropriate gate line routing 712 according to examples of the disclosure (e.g., display pixels can be coupled to different gate line routings depending on whether the display pixels are being driven and sensed, driven but not sensed, grounded, etc., as described in this disclosure). The configuration of FIG. 7C can be substantially that of FIG. 7B, except that gate lines 711*a* and 711*b* can have the ability to be coupled to either of gate line routing 712*a* or 712*b*. In the example of FIG. 7C, this can be accomplished via switches 762 and 764, though it is understood that different configurations can use different mechanisms for achieving the desired coupling effect.

The gate line routing 712 to which a particular gate line 711 is to be coupled can be determined by, for example, touch controller 206 in FIG. 2 based on the particular characteristics of the touch sensing scan that is being performed on touch screen 700*c*. For example, if touch node electrodes in every third row of touch node electrodes are being grounded, the gate lines for those rows can be coupled to one gate line routing (e.g., gate line routing 712*a* via switches 762), and the gate lines for the remaining rows can be coupled to a different gate line routing (e.g., gate line routing 712*b* via switches 764). Further, this coupling can change dynamically based on changes in the touch sensing scan that is being performed on touch screen 700*c*, because each gate line can have the ability to be coupled to any of the gate line routings 712. For example, if in the next touch sensing scan, touch node electrodes in every fourth row of touch node electrodes are being grounded, the gate lines for those rows can be coupled to one gate line routing, and the gate lines for remaining rows can be coupled to another gate line routing.

In some examples, the types of touch node electrodes being isolated from other touch node electrodes using the separated gate line routing scheme of the disclosure can be different from simply the grounded touch node electrodes being isolated from driven and sensed touch node electrodes. The scope of the disclosure can extend to isolating any touch node electrode being operated with a first characteristic from another touch node electrode being operated with a second characteristic via separate gate line routing. Further, while FIGS. 7B and 7C illustrate two gate line routings 712, in some examples, more than two gate line routings can be utilized to isolate touch node electrodes being operated with different characteristics from one another (e.g., a first touch node electrode operating with a first characteristic can be coupled to a first gate line routing, a second touch node electrode operating with a second characteristic can be coupled to a second gate line routing, and a third touch node electrode operating with a third characteristic can be coupled to a third gate line routing). Additionally, the examples of the disclosure can be used in any setting where a conductive line (e.g., a gate line) is coupled to multiple components (e.g., transistors) of different display pixels that are, in turn, coupled (e.g., directly or indirectly) to one or more touch electrodes of interest (e.g., touch electrodes on which touch is sensed). For example, the examples of the disclosure can be applied to a non-integrated touch screen in which a touch sensor panel is overlaid on a display, and one or more display pixels in the display share a gate line (e.g., as described in this disclosure). In such an example, noise can be injected into a touch electrode from a display pixel, through the shared gate line, to another display pixel, and to another touch electrode (e.g., via a capacitive coupling between the other display pixel and the other touch electrode). In such circumstances, it can be beneficial to split the gate line routing for the gate lines of the display pixels, as described in this disclosure.

Thus, the examples of the disclosure provide various gate line routing configurations for reducing the crosstalk of noise signals from one touch node electrode to another touch node electrode to prevent unwanted noise signals from being injected into a touch node electrode being sensed for touch.

Therefore, according to the above, some examples of the disclosure are directed to a touch screen comprising: a first touch node electrode including a first display pixel, the first display pixel coupled to a first gate line; a second touch node electrode including a second display pixel, the second display pixel coupled to a second gate line; and a voltage source coupled to a first gate line routing and a second gate line routing, wherein the first gate line is coupled to the first gate line routing, and the second gate line is coupled to the second gate line routing. Additionally or alternatively to one or more of the examples disclosed above, in some examples, the first gate line is coupled to the first gate line routing via a first switch, and the second gate line is coupled to the second gate line routing via a second switch. Additionally or alternatively to one or more of the examples disclosed above, in some examples, the first touch node electrode is operating with a first characteristic, and the second touch node electrode is operating with a second characteristic, different from the first characteristic. Additionally or alternatively to one or more of the examples disclosed above, in some examples, the first touch node electrode is being driven and sensed, and the second touch node electrode is being grounded. Additionally or alternatively to one or more of the examples disclosed above, in some examples, the first touch node electrode is being driven by a voltage that is the same as a voltage on the voltage source. Additionally or alternatively to one or more of the examples disclosed above, in some examples, the first gate line is selectively coupled to the first gate line routing, and the second gate line is selectively coupled to the second gate line routing. Additionally or alternatively to one or more of the examples disclosed above, in some examples, when a first plurality of touch node electrodes, including the first touch node electrode, is being operated with a first characteristic, and a second plurality of touch node electrodes, including the second touch node electrode, is being operated with a second characteristic, different from the first characteristic, the first gate line is selectively coupled to the first gate line routing, and the second gate line is selectively coupled to the second gate line routing. Additionally or alternatively to one or more of the examples disclosed above, in some examples, when the first plurality of touch node electrodes, including the first touch node electrode, is being operated with the first characteristic, and the second plurality of touch node electrodes, including the second touch node electrode, is being operated with the second characteristic, the first gate line and the second gate line are selectively coupled to the first gate line routing. Additionally or alternatively to one or more of the examples disclosed above, in some examples, the first gate line is dynamically coupled to the first gate line routing, and the second gate line is dynamically coupled to the second gate line routing, based on a current touch screen scan configuration of the touch screen. Additionally or alternatively to one or more of the examples disclosed above, in some examples, when the current touch screen scan configuration is a first configuration, the first gate line is selectively coupled to the first gate line routing, and the second gate line is selectively coupled to the first gate line routing, and when the current touch screen scan configuration is a second configuration, different from the first configuration, the first gate line is selectively coupled to the first gate line routing, and the second gate line is selectively coupled to the second gate line routing. Additionally or alternatively to one or more of the examples disclosed above, in some examples, the first gate line routing and the second gate line routing are disposed on a same side of the touch screen.

Some examples of the disclosure are directed to a method of operating a touch screen, the method comprising: coupling a first display pixel to a first gate line, the first display pixel including a first touch node electrode; coupling a second display pixel to a second gate line, the second display pixel including a second touch node electrode; and coupling a voltage source to a first gate line routing and a second gate line routing, wherein the first gate line is coupled to the first gate line routing, and the second gate line is coupled to the second gate line routing. Additionally or alternatively to one or more of the examples disclosed above, in some examples, the method further comprises coupling the first gate line to the first gate line routing via a first switch, and coupling the second gate line to the second gate line routing via a second switch. Additionally or alternatively to one or more of the examples disclosed above, in some examples, the method further comprises operating the first touch node electrode with a first characteristic, and operating the second touch node electrode with a second characteristic, different from the first characteristic. Additionally or alternatively to one or more of the examples disclosed above, in some examples, the method further comprises driving and sensing the first touch node electrode, and grounding the second touch node electrode. Additionally or alternatively to one or more of the examples disclosed above, in some examples, the method further comprises driving the first touch node electrode with a voltage that is the same as a voltage on the voltage source. Additionally or alternatively to one or more of the examples disclosed above, in some examples, the method further comprises selectively coupling the first gate line to the first gate line routing, and selectively coupling the second gate line to the second gate line routing. Additionally or alternatively to one or more of the examples disclosed above, in some examples, the method further comprises when a first plurality of touch node electrodes, including the first touch node electrode, is being operated with a first characteristic, and a second plurality of touch node electrodes, including the second touch node electrode, is being operated with a second characteristic, different from the first characteristic, selectively coupling the first gate line to the first gate line routing, and selectively coupling the second gate line to the second gate line routing. Additionally or alternatively to one or more of the examples disclosed above, in some examples, the method further comprises when the first plurality of touch node electrodes, including the first touch node electrode, is being operated with the first characteristic, and the second plurality of touch node electrodes, including the second touch node electrode, is being operated with the second characteristic, selectively coupling the first gate line and the second gate to the first gate line routing. Additionally or alternatively to one or more of the examples disclosed above, in some examples, the method further comprises dynamically coupling the first gate line to the first gate line routing, and dynamically coupling the second gate line to the second gate line routing, based on a current touch screen scan configuration of the touch screen. Additionally or alternatively to one or more of the examples disclosed above, in some examples, the method further comprises when the current touch screen scan configuration is a first configuration, selectively coupling the first gate line to the first gate line routing, and selectively coupling the second gate line to the first gate line routing, and when the current touch screen scan configuration is a second configuration, different from the first configuration, selectively coupling the first gate line to the first gate line routing, and selectively coupling the second gate line to the second gate line routing. Additionally or alternatively to one or more of the examples disclosed above, in some examples, the first gate line routing and the second gate line routing are disposed on a same side of the touch screen.

Although examples of this disclosure have been fully described with reference to the accompanying drawings, it is to be noted that various changes and modifications will become apparent to those skilled in the art. Such changes and modifications are to be understood as being included within the scope of examples of this disclosure as defined by the appended claims.

The invention claimed is:

1. A touch screen comprising:
a first touch node electrode including a first display pixel, the first display pixel coupled to a first gate line;
a second touch node electrode including a second display pixel, the second display pixel coupled to a second gate line;
a third touch node electrode including a third display pixel, the third display pixel coupled to a third gate line; and
a voltage source having an output node coupled to a first gate line routing and a second gate line routing, wherein the first gate line is configured to be selectively coupled to the first and second gate line routings, and the second gate line is configured to be selectively coupled to the first and second gate line routings.

2. The touch screen of claim 1, wherein the first gate line is configured to be coupled to the first gate line routing via a first switch, the second gate line is configured to be coupled to the second gate line routing via a second switch, and the third gate line is configured to be coupled to the second gate line routing via a third switch.

3. The touch screen of claim 1, wherein the first touch node electrode is operating with a first characteristic, and the second touch node electrode and the third touch node electrode are operating with a second characteristic, different from the first characteristic.

4. The touch screen of claim 3, wherein the first touch node electrode is being driven and sensed, and the second touch node electrode and the third touch node electrode are being grounded.

5. The touch screen of claim 4, wherein the first touch node electrode is being driven by a voltage that is the same as a voltage on the voltage source.

6. The touch screen of claim 1, wherein the first gate line is selectively coupled to the first gate line routing, and the second gate line and the third gate line are selectively coupled to the second gate line routing.

7. The touch screen of claim 6, wherein:
when a first plurality of touch node electrodes, including the first touch node electrode, is being operated with a first characteristic, and a second plurality of touch node electrodes, including the second touch node electrode and the third touch node electrode, is being operated with a second characteristic, different from the first characteristic, the first gate line is selectively coupled to the first gate line routing, and the second gate line and the third gate line are selectively coupled to the second gate line routing.

8. The touch screen of claim 7, wherein:
when the first plurality of touch node electrodes, including the first touch node electrode, is being operated with the first characteristic, and the second plurality of touch node electrodes, including the second touch node electrode, is being operated with the first characteristic, the first gate line, the second gate line and the third gate line are selectively coupled to the first gate line routing.

9. The touch screen of claim 1, wherein the first gate line is dynamically coupled to the first gate line routing, and the second gate line and the third gate line are dynamically coupled to the second gate line routing, based on a current touch screen scan configuration of the touch screen.

10. The touch screen of claim 9, wherein:
when the current touch screen scan configuration is a first configuration, the first gate line is selectively coupled to the first gate line routing, and the second gate line and the third gate line are selectively coupled to the first gate line routing, and
when the current touch screen scan configuration is a second configuration, different from the first configuration, the first gate line is selectively coupled to the first gate line routing, and the second gate line and the third gate line are selectively coupled to the second gate line routing.

11. The touch screen of claim 1, wherein the first gate line routing and the second gate line routing are disposed on a same side of the touch screen.

12. A method of operating a touch screen, the method comprising:
coupling a first display pixel to a first gate line, the first display pixel including a first touch node electrode;
coupling a second display pixel to a second gate line, the second display pixel including a second touch node electrode;
coupling a third display pixel to a third gate line, the third display pixel including a third touch node electrode; and
coupling an output node of a voltage source to a first gate line routing and a second gate line routing, wherein the first gate line is configured to be selectively coupled to the first and second gate line routings, and the second gate line is configured to be selectively coupled to the first and second gate line routings.

13. The method of claim 12, further comprising coupling the first gate line to the first gate line routing via a first switch, coupling the second gate line to the second gate line routing via a second switch, and coupling the third gate line to the second gate line routing via a third switch.

14. The method of claim 12, further comprising operating the first touch node electrode with a first characteristic, and operating the second touch node electrode and the third touch node electrode with a second characteristic, different from the first characteristic.

15. The method of claim 14, further comprising driving and sensing the first touch node electrode, and grounding the second touch node electrode and the third touch node electrode.

16. The method of claim 15, further comprising driving the first touch node electrode with a voltage that is the same as a voltage on the voltage source.

17. The method of claim 12, further comprising selectively coupling the first gate line to the first gate line routing, and selectively coupling the second gate line and the third gate line to the second gate line routing.

18. The method of claim 17, further comprising:
when a first plurality of touch node electrodes, including the first touch node electrode, is being operated with a first characteristic, and a second plurality of touch node electrodes, including the second touch node electrode and the third touch node electrode, is being operated with a second characteristic, different from the first characteristic, selectively coupling the first gate line to the first gate line routing, and selectively coupling the second gate line and the third gate line to the second gate line routing.

19. The method of claim 18, wherein:
when the first plurality of touch node electrodes, including the first touch node electrode, is being operated with the first characteristic, and the second plurality of touch node electrodes, including the second touch node electrode, is being operated with the first characteristic, the first gate line, the second gate line and the third gate line are selectively coupled to the first gate line routing.

20. The method of claim 12, further comprising dynamically coupling the first gate line to the first gate line routing, and dynamically coupling the second gate line and the third gate line to the second gate line routing, based on a current touch screen scan configuration of the touch screen.

21. The method of claim 20, further comprising:
when the current touch screen scan configuration is a first configuration, selectively coupling the first gate line to the first gate line routing, and selectively coupling the second gate line and the third gate line to the first gate line routing, and
when the current touch screen scan configuration is a second configuration, different from the first configuration, selectively coupling the first gate line to the first gate line routing, and selectively coupling the second gate line and the third gate line to the second gate line routing.

22. The method of claim 12, wherein the first gate line routing and the second gate line routing are disposed on a same side of the touch screen.

23. A touch screen comprising:
a first touch node electrode including a first display pixel, the first display pixel coupled to a first gate line;
a second touch node electrode including a second display pixel, the second display pixel coupled to a second gate line; and
an output node of a voltage source coupled to a first gate line routing and a second gate line routing, wherein the first gate line is configured to be dynamically coupled to the first gate line routing, and the second gate line is configured to be dynamically coupled to the second gate line routing, based on a current touch screen scan configuration of the touch screen,
wherein:
when the current touch screen scan configuration is a first configuration, the first gate line is selectively coupled to the first gate line routing, and the second gate line is selectively coupled to the first gate line routing, and
when the current touch screen scan configuration is a second configuration, different from the first configuration, the first gate line is selectively coupled to the first gate line routing, and the second gate line is selectively coupled to the second gate line routing.

24. The touch screen of claim 23, wherein the first gate line is configured to be coupled to the first gate line routing or the second gate line routing via one or more switches, and the second gate line is configured to be coupled to the first gate line routing or the second gate line routing via one or more switches.

25. A method of operating a touch screen, the method comprising:

coupling a first display pixel to a first gate line, the first display pixel including a first touch node electrode;

coupling a second display pixel to a second gate line, the second display pixel including a second touch node electrode; and coupling an output node of a voltage source to a first gate line routing and a second gate line routing, wherein the first gate line is dynamically coupled to the first gate line routing, and the second gate line is dynamically coupled to the second gate line routing, based on a current touch screen scan configuration of the touch screen, wherein:

when the current touch screen scan configuration is a first configuration, the first gate line is selectively coupled to the first gate line routing, and the second gate line is selectively coupled to the first gate line routing, and when the current touch screen scan configuration is a second configuration, different from the first configuration, the first gate line is selectively coupled to the first gate line routing, and the second gate line is selectively coupled to the second gate line routing.

26. The method of claim 25, further comprising coupling the first gate line to the first gate line routing or the second gate line routing via one or more switches, and coupling the second gate line to the first gate line routing or the second gate line routing via one or more switches.

* * * * *